United States Patent
Jang et al.

(10) Patent No.: US 10,752,761 B2
(45) Date of Patent: Aug. 25, 2020

(54) POLYPROPYLENE RESIN COMPOSITION AND ARTICLE PREPARED THEREFROM

(71) Applicants: Hyundai Motor Company, Seoul (KR); Kia Motors Corporation, Seoul (KR); Hyundai Engineering Plastics Co., Ltd., Dangjin, Chungcheongnam-do (KR)

(72) Inventors: Kyeong Hoon Jang, Seoul (KR); Dae Sik Kim, Goeynggi-do (KR); Jaehyun An, Chungcheongnam-do (KR); Seul Yi, Seoul (KR); In Soo Han, Gyeonggi-do (KR); Eun Seob Shin, Gyeonggi-do (KR); Beom Ho Kim, Chungcheongnam-do (KR); Hyeok Lee, Chungcheongnam-do (KR)

(73) Assignees: Hyundai Motor Company, Seoul (KR); Kia Motors Corporation, Seoul (KR); Hyundai Engineering Plastics Co., Ltd., Dangjin, Chungcheongnam-do (KR)

( * ) Notice: Subject to any disclaimer, the term of this patent is extended or adjusted under 35 U.S.C. 154(b) by 97 days.

(21) Appl. No.: 16/101,462

(22) Filed: Aug. 12, 2018

(65) Prior Publication Data

US 2019/0194435 A1 Jun. 27, 2019

(30) Foreign Application Priority Data

Dec. 21, 2017 (KR) ........................ 10-2017-0176613

(51) Int. Cl.
| | |
|---|---|
| C08L 23/12 | (2006.01) |
| C08F 210/02 | (2006.01) |
| C08F 210/06 | (2006.01) |
| C08F 210/12 | (2006.01) |
| C08F 210/16 | (2006.01) |
| C08K 3/013 | (2018.01) |
| C08J 5/00 | (2006.01) |
| C08J 5/04 | (2006.01) |
| C08K 5/00 | (2006.01) |
| C08L 23/10 | (2006.01) |

(52) U.S. Cl.
CPC ............ *C08L 23/12* (2013.01); *C08F 210/02* (2013.01); *C08F 210/06* (2013.01); *C08F 210/12* (2013.01); *C08F 210/16* (2013.01); *C08J 5/005* (2013.01); *C08J 5/042* (2013.01); *C08K 3/013* (2018.01); *C08K 5/0041* (2013.01); *C08L 23/10* (2013.01); *C08F 2500/01* (2013.01); *C08F 2500/12* (2013.01); *C08F 2500/17* (2013.01); *C08F 2800/20* (2013.01); *C08L 2205/035* (2013.01)

(58) Field of Classification Search
CPC ...... C08L 23/12; C08L 23/10; C08L 23/0815; C08L 23/04; C08L 2205/035; C08F 210/02; C08F 210/12; C08F 210/16; C08F 2500/17; C08F 2800/20; C08F 2500/01; C08F 2520/12; C08K 5/005; C08K 5/042
See application file for complete search history.

(56) References Cited

U.S. PATENT DOCUMENTS

| | | | | |
|---|---|---|---|---|
| 4,945,005 | A * | 7/1990 | Aleckner, Jr. et al. | ...................... C08L 23/06 428/500 |
| 2008/0194752 | A1* | 8/2008 | Jeong et al. ............ | C08L 23/10 524/427 |
| 2010/0010142 | A1* | 1/2010 | Noh et al. ............... | C08L 33/10 524/451 |
| 2012/0095154 | A1* | 4/2012 | Bernreitner et al. ... | C08L 23/04 524/528 |

* cited by examiner

*Primary Examiner* — Nathan M Nutter
(74) *Attorney, Agent, or Firm* — Mintz Levin Cohn Ferris Glovsky and Popeo, P.C.; Peter F. Corless

(57) ABSTRACT

A polypropylene resin composition may include an amount of 40 to 60 wt % of a polypropylene resin, an amount of 1 to 10 wt % of a polyethylene resin, an amount of 10 to 20 wt % of an olefin elastomer, and an amount of 1 to 20 wt % of a reinforcing material wherein all the wt % are based on the total weight of the polypropylene resin composition. Accordingly, a high gloss may be obtained without a coating process and moldability of the polypropylene resin may be obtained. Further provided is a molded article of an interior material or an exterior material of a vehicle manufactured by using the polypropylene resin composition.

20 Claims, 2 Drawing Sheets

POLYPROPYLENE RESIN COMPOSITION AND ARTICLE PREPARED THEREFROM

CROSS-REFERENCE TO RELATED APPLICATION(S)

This application claims priority to and the benefit of Korean Patent Application No. 10-2017-0176613, filed on Dec. 21, 2017 in the Korean Intellectual Property Office, the disclosure of which is incorporated by reference in its entirety.

TECHNICAL FIELD

The present invention relates to a polypropylene resin composition and molded article of an interior material or an exterior material of a vehicle formed by the polypropylene resin composition.

BACKGROUND

Molded articles for interior and exterior parts of a vehicle are manufactured by coating parts or wrapping fibers, thereby improving the appearance of molded articles for interior and exterior parts of vehicles.

The cost ratio of the coating in the production of molded articles for interior and exterior parts of vehicles may be high, and the coated molded articles may not be easily recycled after scrapping. As a result, cost reduction may be difficult and environmental problems may be caused.

SUMMARY

In preferred aspects, the present invention provides a polypropylene resin composition; a molded article including the polypropylene resin composition, which may be suitably produced for an interior material or an exterior material of a vehicle; and a vehicle including the polypropylene resin composition.

In one aspect, a polypropylene resin composition may include: an amount of 40 to 60 wt % of a polypropylene resin, based on the total weight of the polypropylene resin composition; an amount of 1 to 10 wt % of a polyethylene resin, based on the total weight of the polypropylene resin composition; an amount of 10 to 20 wt % of an olefin elastomer, based on the total weight of the polypropylene resin composition; and an amount of 1 to 20 wt % of a reinforcing material, based on the total weight of the polypropylene resin composition.

The polypropylene resin may further include a pigment. The pigment may suitably be an amount of 3 to 5 wt % based on the total weight of the polypropylene resin composition.

The polypropylene resin may include one or more materials selected from the group consisting of a first polypropylene having a melt index of about 10, a second polypropylene having a melt index of about 30, a third polypropylene having a melt index of about 30, and a fourth polypropylene having a melt index of about 60.

In certain aspects, the first, third and fourth polypropylenes suitably may be high crystalline propylene and the second polypropylene suitably may be a copolymer polypropylene. The term "high crystalline propylene" as used herein refers to a propylene resin having higher isotactic index than standard homopolymer resins (e.g., higher than 10 times, higher than 20 times or higher than 30 times) and thus exhibiting a significantly higher stiffness and excellent chemical and heat resistance. In certain embodiments, the copolymer of the second propylene resin suitably may be formed by copolymerizing polypropylene monomer with at least one of other kind of monomer such as ethylene monomers.

The first polypropylene may be in an amount of 20 to 25 wt % based on the total weight of the polypropylene resin composition and the third polypropylene may be in an amount of 0 to 35 wt % based on the total weight of the polypropylene resin composition.

The Mooney viscosity of the olefin elastomer may be 1 to 30 $ML_{1+4}$ (ASTM D1646).

The olefin elastomer may include one or more materials selected from the group consisting of an ethylene-butene rubber (EBR), an ethylene-hexene rubber (EHR), and an ethylene-octene rubber (EOR). The olefin elastomer also will be a different material than other composition components such as the polypropylene resin, or polyethylene resin, and the reinforcing material.

The olefin elastomer may include a first ethylene-α-olefin copolymer having a Mooney viscosity of 20 to 30 $ML_{1+4}$ (ASTM D1646) and a second ethylene-α-olefin copolymer having a Mooney viscosity of 1 to 10 $ML_1+4$ (ASTM D1646).

The first ethylene-α-olefin copolymer may be in an amount of 7 to 10 wt % based on the total weight of the polypropylene resin composition and the second ethylene-α-olefin copolymer may be in an amount of 8 to 11 wt % based on the total weight of the polypropylene resin composition.

The polypropylene resin may be an ethylene-propylene copolymer having an isotactic index of 98 to 100% and a melt flow index of 10 to 60 g/10 min at a temperature of 230° C. under a load of 2.16 kg.

The ethylene-propylene copolymer may include in an amount of 70 to 99 wt % of a propylene monomer based on the total weight of the ethylene-propylene copolymer and in an amount of 1 to 30 wt % of an ethylene monomer based on the total weight of the ethylene-propylene copolymer. The ethylene-propylene copolymer may be formed by copolymerizing the propylene monomer and the ethylene monomer.

The melt flow index of the polypropylene resin may be 0.1 to 10 g/min at a temperature of 190° C., under a load of 2.16 kg weight, and the mean molecular weight of the polypropylene resin may be of 400,000 to 500,000.

The reinforcing material suitably may be polymeric or non-polymeric, more typically, the inorganic reinforcing material that will be non-polymeric. The reinforcing material also may be organic or inorganic. In certain preferred aspects, the reinforcing material is inorganic. Suitably, the reinforcing material may have a molecular weight of less than about 5000, 4000, 3000, 2000, 1000, 500, 400, 300, 200, or less than about 100. Suitably, the inorganic reinforcing material may be substantially not reactive with other components in the composition, for example, polypropylene or polyethylene resin, during preferred typical use of the composition. Suitable reinforcing materials also can be identified empirically, for example, as shown by improved characteristics of the compositions such as coating properties, hardness of an applied composition coating layer, and the like. A variety of the reinforcing material may be suitable inorganic reinforcing material including oxides, one or more materials selected from the group consisting of talc, mica, a whisker, barium sulfate ($BaSO_4$), glass wool, carbon fiber, calcium carbonate ($CaCO_3$), and glass bubbles. The reinforcing material also will be a different material than other compositions such as the polypropylene resin, polyethylene resin and/or olefin elastomer.

The reinforcing material may comprise at least one of talc and mica, and forms a layer structure.

The particle size of the reinforcing material may be of 1 to 15 μm.

The pigment may include one or more materials selected from the group consisting of organic pearl, inorganic pearl, mica, cellulose, and volcanic rock.

The polypropylene resin composition may further include an additive and the additive may include one or more materials selected from the group consisting of an antioxidant, an ultraviolet ray absorbent, a nucleating agent, a coupling agent, a dispersant, a processing lubricant, a slip agent, and an inorganic pigment.

Further provided herein is a polypropylene resin composition may consist essentially of, essentially consist of, or consist of the components as described herein. For instance, the polypropylene resin composition may consist essentially of, essentially consist of, or consist of; an amount of 40 to 60 wt % of a polypropylene resin, based on the total weight of the polypropylene resin composition; an amount of 1 to 10 wt % of a polyethylene resin, based on the total weight of the polypropylene resin composition; an amount of 10 to 20 wt % of an olefin elastomer, based on the total weight of the polypropylene resin composition; and an amount of 1 to 20 wt % of a reinforcing material, based on the total weight of the polypropylene resin composition. In addition, the polypropylene resin composition may consist essentially of, essentially consist of, or consist of; an amount of 40 to 60 wt % of a polypropylene resin, based on the total weight of the polypropylene resin composition; an amount of 1 to 10 wt % of a polyethylene resin, based on the total weight of the polypropylene resin composition; an amount of 10 to 20 wt % of an olefin elastomer, based on the total weight of the polypropylene resin composition; an amount of 1 to 20 wt % of a reinforcing material, based on the total weight of the polypropylene resin composition; and an amount of 3 to 5 wt % based on the total weight of the polypropylene resin composition. In another aspect, provided is a molded article of an interior material or an exterior material of a vehicle that may include the polypropylene resin composition as described herein.

Still provided is a vehicle that may include the polypropylene resin composition as described herein.

Other aspects of the invention are disclosed infra.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
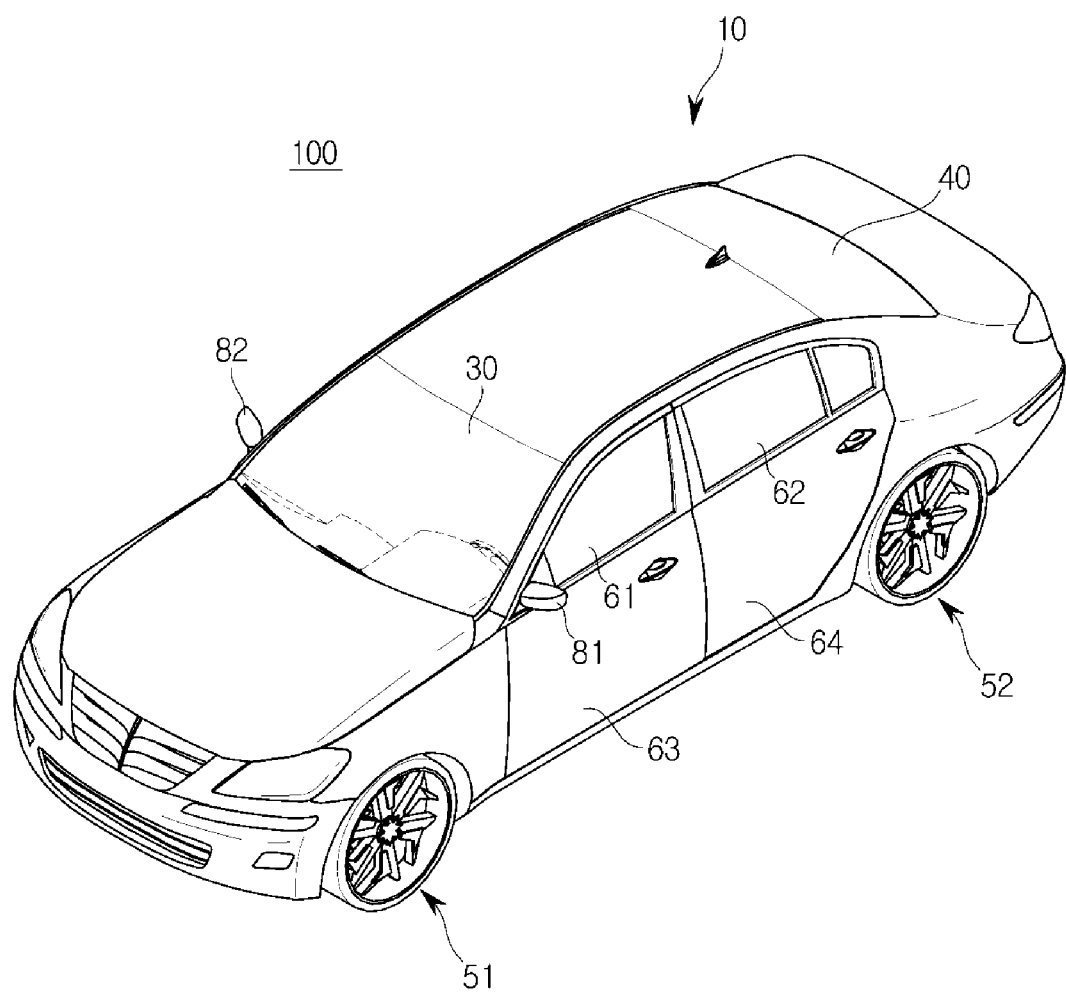
FIG. 1 shows an exemplary exterior of an exemplary vehicle in accordance with an exemplary embodiment of the present invention.

Like reference numerals refer to like elements throughout the description. Well-known functions or constructions are not described in detail since they would obscure one or more exemplar embodiments with unnecessary detail.

As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to embodiments of the present invention, examples of which are illustrated in the accompanying drawings and tables. First, a polypropylene resin composition according to the present invention will be described, and then a vehicle to which the polypropylene resin composition according to various exemplary embodiments of the present invention is applied will be described. By using the polypropylene resin composition according to exemplary embodiments of the present invention, luster on the molded article may be formed without the coating process, and the moldability of the molded article may be maintained at the same time.

The polypropylene resin composition according to one embodiment of the present invention may include (A) an amount of 40 to 60 wt % of a polypropylene resin, (B) an amount of 1 to 10 wt % of a polyethylene resin, (C) an amount of 10 to 20 wt % of an olefin elastomer, and (D) an amount of 1 to 20 wt % of a reinforce material. Hereinafter, each component constituting the polypropylene resin composition according to one embodiment will be described in detail.

(A) Polypropylene Resin

The polypropylene resin may be included in an amount of 40 to 60 wt % by weight based on the total weight of the polypropylene resin composition. When the content of the polypropylene resin is greater than the predetermined amount, e.g., greater than 60 wt %, the rigidity may be improved, but the impact strength may be reduced because the content of the olefin-based elastomer is reduced. On the other hand, when the content of the polypropylene resin is less than the predetermined amount, e.g., less than 40 wt % or less, the impact strength may be increased but the rigidity may be reduced.

The polypropylene resin may be a crystalline polymer including at least one of a propylene homopolymer having a propylene monomer as a main component and an ethylene-propylene copolymer containing ethylene.

The propylene homopolymer and the ethylene-propylene copolymer may be used alone, or a mixture of propylene homopolymer and ethylene-propylene copolymer may be used.

According to one exemplary embodiment of the present invention, the ethylene-propylene copolymer may have an isotactic index of 98 to 100%. In addition, the melt index (MI) measured at a temperature of 230° C. under a load of 2.16 kg may be of 10 to 60 g/10 min. The melt index as used herein may be an index indicating the melt flowability of a plastic material having a certain load and a certain temperature. In the polypropylene resin composition according to one exemplary embodiment, an appropriate range of the melt index may be selected in consideration of both the expansion ratio and mechanical properties.

The ethylene-propylene copolymer may include an amount of 70 to 99 wt % of a propylene monomer based on the total weight of the ethylene-propylene copolymer and an amount of 1 to 30 wt % of an ethylene monomer based on the total weight of the ethylene-propylene copolymer. The ethylene-propylene copolymer may be formed by copolymerizing the propylene monomer and the ethylene monomer.

Also, the polypropylene resin of the present invention may include one or more materials selected from the group consisting of a first polypropylene (A1) which is a high crystalline polypropylene having a melt index of about 10, a second polypropylene (A2) which is a copolymer polypropylene having a melt index of about 30, a third polypropylene (A3) which is a high crystalline polypropylene having a melt index of about 30, and a fourth polypropylene (A4) which is a high crystalline polypropylene having a melt index of about 60.

The first polypropylene, the second polypropylene, the third polypropylene and the fourth polypropylene may suitably be used alone or in combination.

In particular, when the polypropylene resin composition includes an amount of 20 to 25 wt % based on the total weight of the polypropylene resin composition of the first polypropylene and an amount of 30 to 35 wt % based on the total weight of the polypropylene resin composition of the third polypropylene, excellent moldability may be obtained. In this case, the IZOD impact strength at room temperature may be secured to about 150 or greater, and the IZOD impact strength at low temperature may be secured to 30 or greater. Also, the mean molecular weight of the polypropylene resin may suitably be of about 400,000 to 500,000. The polypropylene resins suitably may have a polydispersity of about 4, 3, or less, or suitably or about 2.5, 2, less.

(B) Polyethylene Resin

The polyethylene resin may be included in an amount of 1 to 10 wt % based on the total weight of the polypropylene resin composition. According to one exemplary embodiment of the present invention, the polyethylene resin may be an amount of 5 wt % based on the total weight of the polypropylene resin composition.

The melt flow index of the polyethylene resin may be of 0.1 to 10 g/min at a temperature of 190° C. under a load of about 2.16 kg weight. In the polypropylene resin composition according to one exemplary embodiment, an appropriate range of the melt flow index may be selected in consideration of both the expansion ratio and the mechanical properties.

(C) Olefin Elastomer

The olefin elastomer as used herein may be included for improving the processability, rebound resilience, heat resistance and impact resistance of the polypropylene resin composition.

The olefin elastomer may be included in an amount of 10 to 20 wt %, based on the total weight of the polypropylene resin composition. When the content of the olefin elastomer is less than the predetermined amount, e.g., less than 10 wt %, the impact strength may be deteriorated. On the other hand, when the content of the olefin elastomer is greater than about, e.g., greater than 20 wt %, the rigidity may be deteriorated. The olefin elastomer may affect the shrinkage of the molded article because it affects the dimensional stability of the part of the molded article. It is preferable to include the olefin elastomer within the above-mentioned range of 10 to 20 wt %.

As the olefin elastomer, an ethylene-α-olefin copolymer may be used. The α-olefin used for preparing the ethylene-α-olefin copolymer may be an α-olefin having 4 or more carbon atoms. Specifically, the olefin elastomer may include one or more materials selected from the group consisting of an ethylene-butene-rubber (EBR), an ethylene-hexane-rubber (EHR), and an ethylene-octane-rubber (EOR).

The Mooney viscosity of the olefin elastomer may be of to 30 $ML_{1+4}$ (ASTM D1646). The Mooney viscosity as used herein may be an index indicating the viscosity of the synthetic rubber measured by a Mooney plastometer. Particularly, the olefin elastomer may have a first ethylene-α-olefin copolymer (C1) having a Mooney viscosity of 20 to 30 $ML_{1+4}$ (ASTM D1646) and a second ethylene-α-olefin copolymer (C2) having a Mooney viscosity of 1 to 10 $ML_{1+4}$. The first ethylene-α-olefin copolymer and the second ethylene-α-olefin copolymer may be used alone or in combination. When used alone or in combination, the total content of the ethylene-α-olefin copolymer may be from 15 to 18 wt %. In particular, when the total content of the ethylene-α-olefin copolymer is 18 wt %, all of the flexural modulus, tensile strength and impact strength may be improved.

According to one exemplary embodiment of the present invention, the first ethylene-α-olefin copolymer may be in an amount of 7 to 10 wt % and the second-ethylene-α-olefin copolymer may be in an amount of 8 to 11 wt %. According to one exemplary embodiment of the present invention, the first ethylene-α-olefin copolymer may be 8 wt % and the second-ethylene-α-olefin copolymer may be 10 wt %. In this case, a molded article having appropriate strength and rigidity may be obtained.

(D) Reinforcing Material

The reinforcing material as used herein may improve the rigidity, impact resistance and heat resistance of the polypropylene resin composition.

The polypropylene resin composition may include an amount of 1 to 20 wt % of a reinforcing material, based on the total weight of the polypropylene resin composition. According to one exemplary embodiment of the present invention, the reinforcing material may be included in an amount of 20 wt %.

The reinforcing material may include one or more materials selected from the group consisting of talc, mica, whisker, barium sulfate ($BaSO_4$), glass wool, carbon fiber, calcium carbonate ($CaCO_3$), and glass bubbles.

When the reinforcing material includes at least one of talc and mica, it may be formed into a layer structure. Further, the particle size of the reinforcement material may be of 1 to 15 μm.

(E) Pigment

The polypropylene resin composition may further include the pigment. The pigment as used herein may improve the appearance of a molded article without coating.

According to one exemplary embodiment of the present invention, the pigment may be included in an amount of 3 to 5 wt %, based on the total weight of the polypropylene resin composition. When the pigment is contained in an amount of less than the predetermined amount, e.g., less than 3 wt %, the appearance may not be glossy. On the contrary, when the pigment is contained in an amount greater than the predetermined amount, e.g., greater than 5 wt %, a large amount of gas may be generated and marks may remain on the appearance, which may deteriorate the appearance and reliability of the parts.

(F) Additive

According to the embodiment, at least one additive selected from the group consisting of an antioxidant, an ultraviolet ray absorbent, a nucleating agent, a coupling agent, a dispersant, a processing lubricant, a slip agent and an inorganic pigment may be added to the polypropylene resin composition. The amount of the additive to be used may be adjusted within the range required for each polypropylene resin composition to an optimum range in consideration of the total production amount and the manufacturing process.

The polypropylene resin composition according to an exemplary embodiment of the present invention can be produced by mixing (A) a polypropylene resin. (B) a polyethylene resin, (C) an olefin elastomer, (D) a reinforcing material, (E) a pigment, and (F) an additive according to the composition ratio using a kneader such as a uniaxial extruder, a biaxial extruder, a twin screw extruder, and a Banbury mixer.

However, the method for producing the polypropylene resin composition according to an exemplary embodiment of the present invention is not limited thereto, and the polypropylene resin composition may be prepared by mixing the components using various methods other than the above-mentioned methods.

The molded article for an interior material or an exterior material of a vehicle according to one exemplary embodiment of the present invention may be manufactured by molding the polypropylene resin composition according to the above-described embodiment. For example, a foam molding process may be used, and various shapes such as extrusion molding, compression molding, injection molding, and the like may be applied to foam molding to produce a molded article having a desired shape.

When the polypropylene resin composition according to one exemplary embodiment of the present invention is injected into a mold and high-temperature steam is injected into the mold, a molded article having the shape of the mold may be produced while the mixture is expanded. However, the method of manufacturing a molded article for an interior material or an exterior material of a vehicle using the polypropylene resin composition is not limited thereto, and various other manufacturing methods may be applied to manufacture molded articles for interior and exterior parts of a vehicle.

Hereinafter, the physical properties of the present invention will be described by way of Examples and Comparative Examples of molded articles for interior materials or exterior materials of vehicles manufactured by the above-mentioned polypropylene resin composition. However, the following examples are provided to aid in the understanding of the present invention, and the scope of the present invention is not limited to the following examples.

(A) Polypropylene Resin (A1) First Polypropylene Resin; Highly crystalline polypropylene with a melt index of about 10 g/10 min at a temperature of 230° C. under a load of 2.16 kg was used.

(A2) Second polypropylene resin; Copolymer polypropylene with a melt index of about 30 g/10 min at a temperature of 230° C. under a load of 2.16 kg was used.

(A3) Third polypropylene resin; Highly crystalline polypropylene with a melt index of about 30 g/10 min at a temperature of 230° C. under a load of 2.16 kg was used.

(A4) Fourth polypropylene resin; Highly crystalline polypropylene with a melt index of about 60 g/10 min at a temperature of 230° C. under a load of 2.16 kg was used.

(B) Polyethylene resin; High density polyethylene having a density of 0.94 to 0.96 g/cm$^3$ was used.

(C) Olefin elastomer; An ethylene-octene rubber having a Mooney viscosity of 1 to 10 $ML_{1+4}$ (ASTM D1646) was used.

(C1) First ethylene-α-olefin; An ethylene-octene rubber having a Mooney viscosity of 20 to 30 $ML_{1+4}$ (ASTM D1646) was used.

(C2) Second ethylene-α-olefin; An ethylene-octene rubber having a Mooney viscosity of 1 to 10 $ML_{1+4}$ (ASTM D1646) was used.

(D) Reinforcing material; A plate-shaped talc having a particle size of 5 to 12 μm was used.

(E) Pigment; An inorganic colorant was used.

(F) Additive; An antioxidant was used.

Tables 1A-1B show the composition ratios of the polypropylene resin compositions of Examples and Comparative Examples of the present invention. For each of Examples and Comparative Examples, the following components were mixed to prepare a polypropylene resin composition, which was then extruded using a twin-screw extruder. The extruded pellets were injection-molded using a core-back mold to prepare the specimens.

TABLE 1A

| Composition | Com. 1 | Com. 2 | Com. 3 | Ex. 1 | Ex. 2 | Ex. 3 | Ex. 4 | Ex. 5 | Ex. 6 |
|---|---|---|---|---|---|---|---|---|---|
| A1 | 20 | 20 | 20 | 20 | 20 | 20 | 20 | 20 | 20 |
| A2 | 35 | 15 | 45 | 35 | 35 | 35 | 35 | 25 | 35 |
| A3 | — | — | — | — | — | — | — | — | — |
| A4 | — | — | — | — | — | — | — | — | — |
| B | 5 | 5 | 5 | 5 | 5 | 5 | 5 | 5 | 5 |
| C1 | — | — | — | — | — | — | — | — | — |
| C2 | 15 | 35 | 5 | 15 | 15 | 15 | 15 | 25 | 25 |
| D | 20 | 20 | 20 | 20 | 20 | 20 | 20 | 20 | 20 |
| E | — | 5 | 5 | 1 | 3 | 5 | 7 | 5 | 5 |
| F | 5 | 5 | 5 | 5 | 5 | 5 | 5 | 5 | 5 |

TABLE 1B

| Composition | Ex. 7 | Ex. 8 | Ex. 9 | Ex. 10 | Ex. 11 | Ex. 12 | Ex. 13 | Ex. 14 |
|---|---|---|---|---|---|---|---|---|
| A1 | 25 | 20 | 25 | 20 | 20 | 17 | 17 | 17 |
| A2 | — | — | — | — | 35 | 35 | 35 | 35 |
| A3 | 30 | 35 | — | — | — | — | — | — |
| A4 | — | — | 30 | 35 | — | — | — | — |
| B | 5 | 5 | 5 | 5 | 5 | 5 | 5 | 5 |
| C1 | — | — | — | — | 15 | — | 18 | 8 |
| C2 | 15 | 15 | 15 | 15 | — | 18 | — | 10 |
| D | 20 | 20 | 20 | 20 | 20 | 20 | 20 | 20 |
| E | 5 | 5 | 5 | 5 | 5 | 5 | 5 | 5 |
| F | 5 | 5 | 5 | 5 | 5 | 5 | 5 | 5 |

(Unit: wt %)

<Property Evaluation Method>

The following items were measured to evaluate the physical properties and workability of the specimens prepared according to Examples 1 to 14 and Comparative Examples 1 to 3, and the results are shown in the following Tables 2A-2B below.

(1) Melt Index (MI): ASTM D-1238 and measured at a temperature of a temperature of 230° C. and a stress load of 21.2N.
(2) Specific Gravity (g/cm 3): Measured according to ASTM D-792.
(3) Elongation (%): Measured according to ASTM D-638.
(4) Tensile Strength (MPa): Measured according to ASTM D-638 and measured with type 1 at a speed of 50 mm/min.
(5) Flexural Modulus (MPa): Measured according to ASTM D-790 and measured at a speed of 30 mm/min.
(6) IZOD Impact Strength at Room Temperature (J/m): Measured according to ASTM D-256 and measured at a temperature of 23° C.
(7) IZOD Impact Strength at Low Temperature (J/m): Measured according to ASTM D-256 and measured at a temperature of −10° C.
(8) HDT (° C.): Measured according to ASTM D-648 and measured at a stress load of 0.45 MPa.
(9) Scratches (ΔL): Measured according to MS 210-05, and the Ericsson evaluation was carried out in accordance with Section 4.9.
(10) Contraction Ratio (1/1000): HEP (Hyundai EP) method. The tensile strength of the specimen was 1/1000 and the length and thickness were measured 48 hours after ASTM specimen injection. The contraction ratio was calculated by the following equation.

Contraction ratio=($L$−length of crystallization completed specimen after injection)/$L$*1000

L is the length of the original specimen. When the material is injected, the material is shrunk through crystallization, and the crystallization is completed 48 hours after injection.

(11) Appearance: Appearance was Evaluated with the Naked Eye.
  ⊚: EXCELLENT means that there are no problems such as scratches, foreign body, discoloration, weld lines, flow marks, and gas, and it is suitable for use as a part.
  ○: GOOD means it is suitable to be used as a part in a state requiring a slight improvement.
  Δ: FAIR means it is improper to use the parts as it is in need of an improvement.
  X: POOR means the part is defective.

TABLE 2A

| Item | Com. 1 | Com. 2 | Com. 3 | Ex. 1 | Ex. 2 | Ex. 3 | Ex. 4 | Ex. 5 | Ex. 6 |
|---|---|---|---|---|---|---|---|---|---|
| Melt Index | 17 | 4 | 22 | 16 | 15 | 14 | 12 | 9 | 14 |
| Specific Gravity (g/cm 3): | 1.04 | 1.05 | 1.05 | 1.04 | 1.05 | 1.06 | 1.006 | 1.05 | 1.05 |
| Elongation (%) | 85 | 252 | 58 | 85 | 85 | 83 | 83 | 150 | 83 |
| Tensile Strength (MPa) | 23 | 15.5 | 27.2 | 23.4 | 23.8 | 23.9 | 24.2 | 18.2 | 23.9 |
| Flexural Modulus (MPa) | 2250 | 1080 | 2610 | 2260 | 2295 | 2370 | 2385 | 1780 | 2350 |
| IZOD Impact Strength at Room Temperature (J/m) | 210 | NB | 78 | 190 | 175 | 162 | 149 | 370 | 162 |
| IZOD Impact Strength at Low Temperature (J/m) | 52 | 120 | 32 | 50 | 44 | 41 | 38 | 59 | 41 |
| HDT (° C.) | 126.5 | 108.5 | 129.2 | 126.5 | 126.8 | 126.8 | 127.1 | 118.9 | 126.8 |
| Scratches (ΔL) | 1 | 1.8 | 0.8 | 1 | 1.1 | 1.3 | 1.5 | 1.6 | 1.3 |
| Contraction Ratio | — | 6.5 | 11.5 | — | — | — | — | 8 | 10 |
| Appearance | Coating Process | Δ | ⊚ | Δ | ○ | ⊚ | X | ○ | ⊚ |

TABLE 2B

| Item | Ex. 7 | Ex. 8 | Ex. 9 | Ex. 10 | Ex. 11 | Ex. 12 | Ex. 13 | Ex. 14 |
|---|---|---|---|---|---|---|---|---|
| Melt Index | 14 | 17 | 25 | 27 | 10 | 16 | 8 | 14 |
| Specific Gravity (g/cm 3): | 1.06 | 1.06 | 1.06 | 1.06 | 1.06 | 1.06 | 1.06 | 1.06 |
| Elongation (%) | 82 | 82 | 80 | 80 | 95 | 105 | 128 | 110 |
| Tensile Strength (MPa) | 25.5 | 26.7 | 27.5 | 27.7 | 26.1 | 24.5 | 23.8 | 24.3 |
| Flexural Modulus (MPa) | 2535 | 2575 | 2610 | 2680 | 2510 | 2220 | 2150 | 2205 |
| IZOD Impact Strength at Room Temperature (J/m) | 158 | 152 | 132 | 125 | 163 | 185 | 198 | 203 |
| IZOD Impact Strength at Low Temperature (J/m) | 39 | 38 | 28 | 25 | 43 | 51 | 56 | 52 |
| HDT (° C.) | 129.9 | 129.1 | 130.1 | 130.7 | 128.8 | 127.3 | 126.9 | 127.1 |
| Scratches (ΔL) | 1.1 | 1 | 1 | 1 | 1.1 | 0.9 | 1.1 | 0.9 |
| Contraction Ratio | — | — | — | — | — | — | — | — |
| Appearance | ◎ | ◎ | ◎ | ◎ | ◎ | ◎ | ◎ | ◎ |

Referring to the results of the measurement of the Tables 2A-2B, when Comparative Example 1 in which the coating process was performed without adding any additional pigment and Example 3 were compared, Example 3 containing 5 wt % of pigment can be confirmed that it is evaluated at the same level as the coating process. Even in the case of Example 2 containing 3 wt % of pigment, it can be confirmed that the appearance evaluation is similar to that of the coating process. However, in the case of Example 1 containing 1 wt % of pigment and Example 4 containing 7 wt % of pigment, it can be confirmed that the appearance evaluation is low. Accordingly, it can be confirmed that the pigment is suitably contained in an amount of 3 to 5 wt % based on the total weight of the polypropylene resin composition.

In addition, in Comparative Example 2 including 20 wt % of the first polypropylene resin and 15 wt % of the second polypropylene resin, it was confirmed that the impact strength was high but the tensile strength and the flexural modulus were lowered. In Comparative Example 3 containing 20 wt % of the first polypropylene resin and 45 wt % of the second polypropylene resin, the tensile strength and flexural modulus were high, but the impact strength was low. Example 5 containing 20 wt % of the first polypropylene resin and 25 wt % of the second polypropylene resin, and Example 6 containing 20 wt % of the first polypropylene resin and 35 wt % of the second polypropylene resin, it can be confirmed that the impact strength, flexural modulus and tensile strength can be secured.

In addition, the polypropylene resins can be used alone or in combination as in Example 3, Example 7, Example 8. Example 9, and Example 10. In the case of Example 3, Example 7 and Example 8, it was possible to secure an IZOD impact strength of 150 J/m or more at room temperature and 30 or more at low temperature. In the case of Example 8, the melt index of 17, which is the same as that of the conventional resin described in Comparative Example 1, was obtained. It is confirmed that the case where the first polypropylene resin is 20 wt % and the third polypropylene resin is 35 wt % is the most appropriate.

Further, as in Example 3, Example 11, Example 12. Example 13 and Example 14, the first ethylene-α-olefin copolymer and the second ethylene-α-olefin copolymer used alone or in combination can be used. It can be confirmed that the flexural modulus and tensile strength of Example 3 and Example 11 in which the sum of the first ethylene-α-olefin copolymer and the second ethylene-α-olefin copolymer was 15 wt % were improved, however, the tensile strength was lowered. In the case of Example 12. Example 13, and Example 14 in which the sum of the first ethylene-α-olefin copolymer and the second ethylene-α-olefin copolymer was 18 wt %, the flexural modulus and tensile strength were confirmed. Thus, it can be seen that the case where the sum of the first ethylene-α-olefin copolymer and the second ethylene-α-olefin copolymer was 18 wt % is appropriate. Considering the melt index, tensile strength, flexural modulus and impact strength, it is preferable to mix 8 wt % of the first ethylene-α-olefin copolymer and 10 wt % of the second ethylene-α-olefin copolymer.

(A) 40 to 60 wt % of a polypropylene resin, (B) 1 to 10 wt % of a polyethylene resin, (C) 10 to 20 wt % of an olefin elastomer, (D) 1 to 20 wt % of a reinforcing material can be used for the interior material or the exterior material of a vehicle. The polypropylene resin composition described above may further include a pigment. In addition, the above-mentioned polypropylene resin composition may further include additives.

FIG. 1 is a view illustrating the exterior of a vehicle in accordance with an embodiment of the present disclosure.

According to FIG. 1, a vehicle 100 may include a vehicle body 1 that forms an outer appearance of the vehicle 100, a front window 30 that may provide a driver inside the vehicle 100 with a view of the front of the vehicle 100, a rear window 40 that provides the driver inside the vehicle 100 with a view of the rear of the vehicle 100, wheels 51, 52 for moving the vehicle 100, a driving device (not shown) rotating the wheels 51, 52, doors 63, 64 for shielding the interior of the vehicle 100 from the outside, and side mirrors 81, 82 for providing a rear view of the vehicle 100 to the driver.

The wheels 51, 52 may be the front wheel 51 provided at the front of the vehicle 100 and the rear wheel 52 provided at the rear of the vehicle 100. The driving device may provide a rotational force to the front wheel 51 or the rear wheel 52 to move the vehicle body 1 forward or backward. Such a drive device may employ a motor (not shown) that generates power by receiving power from an engine (not shown) or a capacitor (not shown) that generates combustion power by burning fossil fuel.

The doors 63, 64 may be rotatably provided on the left and right sides of the vehicle body 1 and may allow the driver to enter inside the vehicle 100 at the time of opening. The inside of the vehicle 100 may be shielded from the outside when the doors 63, 64 are closed. The doors 63, 64 may include the front door 63 positioned in front of the vehicle body 1 and the rear door 64 positioned rearward of the vehicle body 1.

The doors 63, 64 may be provided with side windows 61, 62 which may be seen from the outside or from the inside. According to an exemplary embodiment, the side windows 61, 62 may be provided so as to be viewed from only one side, and may be provided to be openable and closable.

The side mirrors 81, 82 may include the left side mirror 81 provided on the left side of the vehicle body 1 and the right side mirror 82 provided on the right side. The side mirrors 81, 82 may enable the driver inside the vehicle 100 to acquire sight information of the side and rear of the vehicle 100.

Figure 2:
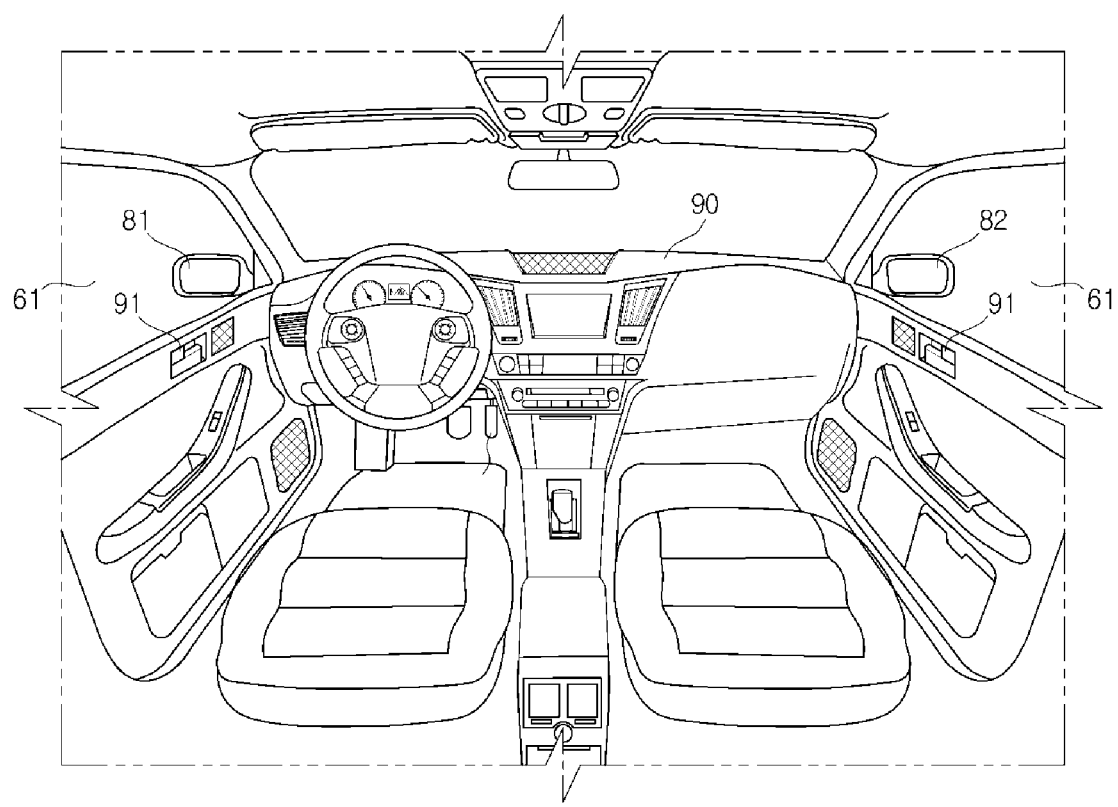
FIG. 2 shows an exemplary a molded article forming an exemplary interior material or an exemplary exterior material of an exemplary vehicle produced by an exemplary polypropylene resin composition in accordance with an exemplary embodiment of the present invention.

FIG. 2 is a view illustrating an example in which a molded article may form an exemplary interior material or an exemplary exterior material of an exemplary vehicle produced by an exemplary polypropylene resin composition in accordance with an exemplary embodiment of the present invention.

According to FIG. 2, an exemplary interior material such as an instrument panel 90, a door trim 93, etc. of the vehicle 1 may be a molded article made of an exemplary polypropylene resin composition according to an exemplary embodiment of the present invention. In particular, an inner handle 91 of the door trim 93 may be made of an exemplary polypropylene resin according to an exemplary embodiment of the present invention.

However, the molded article for the interior material or the exterior material of the vehicle manufactured by the polypropylene resin composition of the embodiment of the present invention is not limited thereto, and a polypropylene resin composition according to the embodiment of the present invention may be used for other interior or exterior materials.

The molded article for an exemplary interior material or an exemplary exterior material of the vehicle manufactured by an exemplary polypropylene resin composition according to an exemplary embodiment of the present invention can realize the appearance of the vehicle without applying a coating process, thereby reducing costs incurred by the coating process. Further, since organic paint is not applied to the vehicle, the indoor air quality of the vehicle may be improved. In addition, since the moldability may be maintained in the same manner as the existing mold, the reliability of the parts of the vehicle may be satisfied. In addition, there is an advantage in that the coating film may be recycled without being separated at the time of recycling after scrapping.

The preferred exemplary embodiments disclosed with reference to the accompanying drawings and tables have been described above. It will be understood by those skilled in the art that various changes in form and details may be made therein without departing from the spirit and scope of the invention as defined by the appended claims and their equivalents. The disclosed embodiments are illustrative and should not be construed as limiting.

What is claimed is:

1. A polypropylene resin composition comprising:
    an amount of 40 to 60 wt % of a polypropylene resin, based on the total weight of the polypropylene resin composition;
    an amount of 1 to 10 wt % of a polyethylene resin, based on the total weight of the polypropylene resin composition;
    an amount of 10 to 20 wt % of an olefin elastomer, based on the total weight of the polypropylene resin composition; and
    an amount of 1 to 20 wt % of a reinforcing material, based on the total weight of the polypropylene resin composition;
    wherein the polypropylene resin comprises one or more materials selected from the group consisting of a first polypropylene having a melt index of 10 g/10 min, a second polypropylene having a melt index of 30 g/10 min, a third polypropylene having a melt index of 30 g/10 min, and a fourth polypropylene having a melt index of 60 g/10 min, and
    wherein the polypropylene resin comprises the first polypropylene in an amount of 20 to 25 wt % based on the total weight of the polypropylene resin composition and the third polypropylene in an amount of 30 to 35 wt % based on the total weight of the polypropylene resin composition.

2. The polypropylene resin composition of claim 1, further comprising a pigment.

3. The polypropylene resin composition of claim 2, wherein the pigment is in an amount of 3 to 5 wt % based on the total weight of the polypropylene resin composition.

4. The polypropylene resin composition of claim 1, wherein a Mooney viscosity of the olefin elastomer is of 1 to 30 $ML_{1+4}$ (ASTM D1646).

5. The polypropylene resin composition of claim 4, wherein the olefin elastomer comprises one or more materials selected from the group consisting of an ethylene-butene rubber (EBR), an ethylene-hexene rubber (EHR), and an Ethylene-octene rubber (EOR).

6. The polypropylene resin composition of claim 5, wherein the olefin elastomer comprises a first ethylene-α-olefin copolymer having a Mooney viscosity of 20 to 30 $ML_{1+4}$ (ASTM D 1646) and a second ethylene-α-olefin copolymer having a Mooney viscosity of 1 to 10 $ML_{1+4}$ (ASTM D1646).

7. The polypropylene resin composition of claim 6, wherein the first ethylene-α-olefin copolymer is in an amount of 7 to 10 wt % based on the total weight of the polypropylene resin composition and the second ethylene-α-olefin copolymer is in an amount of 8 to 11 wt % based on the total weight of the polypropylene resin composition.

8. The polypropylene resin composition of claim 1, wherein the polypropylene resin is an ethylene-propylene copolymer having an isotactic index of 98 to 100% and a melt flow index of 10 to 60 g/10 min at a temperature of 230° C. under a load of 2.16 kg.

9. The polypropylene resin composition of claim 8, wherein the ethylene-propylene copolymer comprises an amount of 70 to 99 wt % of a propylene monomer based on the total weight of the ethylene-propylene copolymer and an amount of 1 to 30 wt % of an ethylene monomer based on the total weight of the ethylene-propylene copolymer.

10. The polypropylene resin composition of claim 9, wherein the ethylene-propylene copolymer is formed by copolymerizing the propylene monomer and the ethylene monomer.

11. The polypropylene resin composition of claim 1, wherein a melt flow index of the polypropylene resin is of 0.1 to 10 g/min at a temperature of 190° C. under a load of 2.16 kg weight, and the mean molecular weight of the polypropylene resin is of 400,000 to 500,000.

12. The polypropylene resin composition of claim 1, wherein the reinforcing material comprises one or more materials selected from the group consisting of talc, mica, barium sulfate ($BaSO_4$), glass wool, carbon fiber, calcium carbonate ($CaCO_3$), and glass bubbles.

13. The polypropylene resin composition of claim 12, wherein the reinforcing material comprises at least one of talc and mica, and forms a layer structure.

14. The polypropylene resin composition of claim 13, wherein the particle size of the reinforcing material is of 1 to 15 μm.

15. The polypropylene resin composition of claim 2, wherein the pigment comprises one or more materials selected from the group consisting of organic pearl, inorganic pearl, mica, cellulose, and volcanic rock.

16. The polypropylene resin composition of claim 1, further comprising:
an additive, wherein the additive comprises one or more materials selected from the group consisting of an antioxidant, an ultraviolet ray absorbent, a nucleating agent, a coupling agent, a dispersant, a processing lubricant, a slip agent, and an inorganic pigment.

17. A molded article of an interior material or an exterior material of a vehicle comprising a polypropylene resin composition of claim 1.

18. A vehicle comprising a polypropylene resin composition of claim 1.

19. A polypropylene resin composition comprising:
an amount of 40 to 60 wt % of a polypropylene resin, based on the total weight of the polypropylene resin composition;
an amount of 1 to 10 wt % of a polyethylene resin, based on the total weight of the polypropylene resin composition;
an amount of 10 to 20 wt % of an olefin elastomer, based on the total weight of the polypropylene resin composition; and
an amount of 1 to 20 wt % of a reinforcing material, based on the total weight of the polypropylene resin composition,
wherein the olefin elastomer comprises one or more materials selected from the group consisting of an ethylene-butene rubber (EBR), an ethylene-hexene rubber (EHR), and an Ethylene-octene rubber (EOR),
wherein the olefin elastomer comprises a first ethylene-α-olefin copolymer having a Mooney viscosity of 20 to 30 ML1+4 (ASTM D1646) and a second ethylene-α-olefin copolymer having a Mooney viscosity of 1 to 10 ML1+4 (ASTMD1646), and wherein the olefin elastomer has a Mooney viscosity of 1 to 30 ML1+4 (ASTM D1646).

20. A molded article of an interior material or an exterior material of a vehicle comprising a polypropylene resin composition of claim 19.

* * * * *